(12) United States Patent
Lemaitre

(10) Patent No.: US 12,153,779 B2
(45) Date of Patent: Nov. 26, 2024

(54) METHOD FOR MANAGING ACCESS TO A PLURALITY OF BOTS WITH PRE-DISPLAY OF USER-SPECIFIC INFORMATION, CORRESPONDING COMPUTER PROGRAM PRODUCT, STORAGE MEDIUM AND TERMINAL

(71) Applicant: Orange, Issy-les-Moulineaux (FR)

(72) Inventor: Sébastien Lemaitre, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/254,844

(22) PCT Filed: Nov. 18, 2021

(86) PCT No.: PCT/FR2021/052032
§ 371 (c)(1),
(2) Date: May 26, 2023

(87) PCT Pub. No.: WO2022/112686
PCT Pub. Date: Jun. 2, 2022

(65) Prior Publication Data
US 2024/0012543 A1    Jan. 11, 2024

(30) Foreign Application Priority Data
Nov. 27, 2020    (FR) ...................................... 2012253

(51) Int. Cl.
*G06F 3/0482* (2013.01)
*G06F 3/0484* (2022.01)
*G06F 16/332* (2019.01)
(52) U.S. Cl.
CPC .......... *G06F 3/0484* (2013.01); *G06F 3/0482* (2013.01); *G06F 16/3329* (2019.01)

(58) Field of Classification Search
CPC ... G06F 3/0484; G06F 16/3329; G06F 3/0482
See application file for complete search history.

(56) References Cited

U.S. PATENT DOCUMENTS

| 2017/0171209 A1* | 6/2017 | Licklider | ................ G06F 21/31 |
| 2018/0287968 A1* | 10/2018 | Koukoumidis | ....... G06F 40/289 |
| 2018/0375947 A1* | 12/2018 | Hodges | .................. H04W 4/21 |

FOREIGN PATENT DOCUMENTS

WO    WO 2018/187098 A1    10/2018

OTHER PUBLICATIONS

Dijana R. Vukovic et al., Facebook Messenger Bots and Their Application for Business, Nov. 1, 2016, 24th Telecommunications forum, pp. 1-4 (Year: 2016).*

(Continued)

*Primary Examiner* — Tam T Tran
(74) *Attorney, Agent, or Firm* — Knobbe, Martens, Olson & Bear, LLP

(57) ABSTRACT

Method for managing access to a plurality of bots, in which the following are performed by a search interface run on a first terminal. During a first access by a user to the search interface: receiving an identifier associated with a target mobile terminal and an indication of the user's consent; storing, on the first terminal, the identifier associated with the target mobile terminal and the indication of consent; and receiving a request to launch a lookup operation with a view to selecting a bot and opening a conversation between the latter and the target mobile terminal. The method includes during a subsequent access: pre-displaying the stored identifier and indication of consent; and receiving a new request to launch the lookup operation with a view to selecting a new bot and opening a conversation between the latter and the target mobile terminal.

9 Claims, 14 Drawing Sheets

(56) References Cited

OTHER PUBLICATIONS

Peining Shi et al., Detecting Malicious Social Bots Based on Clickstream Sequences, Jan. 1, 2019, IEEE Access, vol. 7, pp. 28855-28862 (Year: 2019).*
International Search Report for International Application No. PCT/FR2021/052032 dated Feb. 3, 2022.
Chatbot, "Frequently Asked Questions about LiveChat, Inc's GDPR compliance", Nov. 17, 2020, pp. 1-11, Retrieved from the Internet: http://web.archive.org/web/20201117135843/www.chatbot.com/legal/gdpr-faq/.
Adam Marczak—Azure for Everyone, "Azure Bot Service Tutorial | Create Chatbots in minutes", Oct. 22, 2019, Retrieved from the Internet: https://www.youtube.com/watch?v=FHc_IZ6jJY.
Microsoft Azure, "Microsoft identity platform's permissions and consent framework", May 15, 2020, Retrieved from the Internet: https://www.youtube.com/watch?v=toAWRNqqDL4.

* cited by examiner

METHOD FOR MANAGING ACCESS TO A PLURALITY OF BOTS WITH PRE-DISPLAY OF USER-SPECIFIC INFORMATION, CORRESPONDING COMPUTER PROGRAM PRODUCT, STORAGE MEDIUM AND TERMINAL

CROSS-REFERENCE TO RELATED APPLICATIONS

This application is filed under 35 U.S.C. § 371 as the U.S. National Phase of Application No. PCT/FR2021/052032 entitled "METHOD FOR MANAGING ACCESS TO A PLURALITY OF BOTS WITH PRE-DISPLAY OF USER-SPECIFIC INFORMATION, COMPUTER SOFTWARE PRODUCT, STORAGE MEDIUM AND CORRESPONDING TERMINAL" and filed Nov. 18, 2021, and which claims priority to FR 2012253 filed Nov. 27, 2020, each of which is incorporated by reference in its entirety.

TECHNICAL FIELD

The field of the development is that of bots. A bot (contraction of "robot") is defined as a computer program (software) operating autonomously and automatically, and capable of processing (that is understanding) information (for example, a dialogue) and triggering actions. The main task of a bot is to perform specific tasks repeatedly.

Chatbots (also referred to as "conversational robots") are a special category of bots. A chatbot is a computer program that simulates conversations (in natural language, for example) with real users. It is used in particular, but not exclusively, to solve problems (for example, for pre-sales and/or post-sales customer support), place orders, etc. Originally, chatbots were based on libraries of questions/answers with predefined scenarios. As progress has been made, thanks to artificial intelligence, some chatbots have become capable of analysing and understanding messages through natural language processing, and learning with machine learning.

More specifically, the development relates to a solution for managing access to a plurality of bots (including chatbots) by a user having at least one mobile terminal.

"Mobile terminal" refers in particular to a smartphone or a tablet.

Technological Background

Currently, when a user wants to "launch" a bot (that is communicate (converse) with a bot) from their mobile terminal, each time they must enter an identifier associated with their mobile terminal (for example, a telephone number, a SIP URI (Session Initiation Protocol—Uniform Resource Identifier) identity or other), before initialising the communication (conversation) with this bot. To this end, the mobile terminal sends a request containing the identifier associated with it to a server of the telecommunications operator to which the user subscribed, in order to validate this identifier. If this identifier is valid, the mobile terminal is then linked to the bot, via a connection server controlled by the telecommunications operator's server.

Each time a bot is launched, the user must also explicitly provide their consent for the bot to reach the user with the identifier (telephone number, SIP URI or other) provider by the latter.

The obligation for the user to provide the identifier associated with their mobile terminal and their consent, each time a bot is launched, aims at ensuring compliance with the General Data Protection Regulation (GDPR). Thus, the user is protected, that is they are contacted by a bot only if they want to be. Conversely, on the network side, the service that provides the bot is also protected, the bot conversing only with users who want to do so and whose identifier has been validated.

Unfortunately, this management of user data in compliance with the GDPR (with the obligation to enter the above-mentioned identifier and to provide consent), makes it tedious for the user to use the bots.

There is, therefore, a need to ensure compliance with the GDPR while facilitating the actions required from the user to launch bots and be able to communicate (converse) with them.

SUMMARY

In a particular embodiment of the development, a method for managing access to a plurality of bots by a user is proposed, in which a bot search interface, run on a first terminal available to the user, performs the following steps:
 during a first access by the user to the bot search interface:
  receiving, via a user interface, an identifier associated with a target mobile terminal and an indication of the user's consent, said target mobile terminal belonging to the group comprising the first terminal if it is of the mobile type and at least a second mobile terminal different from the first terminal;
  storing, on the first terminal, the identifier associated with the target mobile terminal and the indication of consent; and
  receiving, via the user interface, a request to launch a lookup operation with a view to selecting one of the bots and opening a conversation between the target mobile terminal and the selected bot;
 during a subsequent access by the user to the bot search interface:
  pre-displaying, via the user interface, the stored identifier associated with the target mobile terminal and indication of consent; and
  receiving, via the user interface, a new request to launch the lookup operation with a view to selecting one of the bots again and opening a conversation between the target mobile terminal and the newly selected bot.

Thus, the proposed solution is based on the use, in an initial phase known as search phase, of a bot search interface that manages, on the one hand, the obtaining of user-specific information (identifier associated with the target mobile terminal and consent) and, on the other hand, the search itself (by launching a lookup operation that will allow the selection of one of the bots and the opening of a conversation between the target mobile terminal and the selected bot).

After each access by the user to the bot search interface, a selected bot and user-specific information (identifier associated with the target mobile terminal and consent) are available to it. This information is used in a subsequent phase, knows as conversation phase, to allow (in compliance with the GDPR) the opening of a conversation between the selected bot and the user, and more specifically their target mobile terminal.

The proposed solution is also based on the fact that the operation of the bot search interface differs depending on whether it is a first access or a subsequent access by the user to this search interface:

if it is a first access, the user provides their specific information: identifier associated with the target mobile terminal and indication of their consent;

if it is a subsequent access, the user does not have to provide their specific information again because it is pre-displayed by the search interface (that stored it during the first access), for confirmation or modification by the user.

One advantage of the proposed solution is that the user provides their specific information (identifier associated with the target mobile terminal and consent) only once, during the first access. During each subsequent access, they do not have to enter it again. They can simply confirm it, but also modify it if necessary.

Another advantage of the proposed solution is that, on the network side, it offers a common protection to all services providing the searchable bots. Indeed, during the first access, the user provides their specific information (identifier associated with the target mobile terminal and consent) for all the bots they will search (both during the first access and each subsequent access) with a view to conversing with them.

Yet another advantage of the proposed solution is that the first terminal that runs the search interface with which the bot search is performed is not necessarily the target mobile terminal that enters into conversation with the selected bot. In this case, the first terminal can be of the mobile or fixed (a computer, for example) type. A second mobile terminal is then the target mobile terminal.

In other words, if they want to do so, the user can transfer the bot search to a first terminal (mobile or fixed) different from the target mobile terminal used to converse with the bots. Such a transfer can have different advantages:

saving the battery of the target mobile terminal;

saving the mobile connection costs of the target mobile terminal (for example, in the case of a limited mobile plan);

allowing the user to search for bots even if their target mobile terminal is not available to them or if the latter it is not operational (discharged battery, for example) or is in non-mobile access (Wi-Fi, ADSL (Asymmetric Digital Subscriber Line), fibre, etc.);

using a more user-friendly terminal (for example, a fixed terminal such as a computer or tablet) to search for bots;

not disclosing, when searching for bots, a particular identity (professional, for example) linked to the identifier associated with the target mobile terminal;

etc.

According to a particular feature, in the pre-displaying step, the pre-displayed identifier can be modified. If the pre-displaying step is followed by a step of receiving a modification, via the user interface, of the pre-displayed identifier by an identifier associated with another target mobile terminal, then the reception, via the user interface, of the new request to launch the lookup operation is with a view to selecting again one of the bots and opening a conversation between said other target mobile terminal and the newly selected bot.

Thus, the user can change the target mobile terminal, for example depending on the type of bot selected.

According to a particular feature, in the pre-displaying step, the pre-displayed identifier can be modified. If the pre-displaying step is followed by a step of receiving a modification, via the user interface, of the pre-displayed identifier by another identifier associated with the target mobile terminal, then the reception, via the user interface, of the new request to launch the lookup operation is with a view to selecting again one of the bots and opening a conversation between the target mobile terminal, with said other identifier, and the newly selected bot.

Thus, the user can choose, for example according to the type of bot selected, one identifier among several ones associated with the same target mobile terminal (for example, in the case of a target mobile terminal equipped with several SIM (Subscriber Identification Module) cards).

According to a particular characteristic, the step of receiving, via the user interface, the identifier associated with the target mobile terminal and the indication of consent from the user, is followed by a step of launching a verification, with a server of a telecommunications operator, of the identifier received, and only a positive verification of the identifier received authorizes an execution of the step of receiving, via the user interface, the request to launch the lookup operation.

Verifying the identifier associated with the target mobile terminal provided by the user prevents a malicious third party from using the identifiers associated with users' terminals (without their consent) to get them to enter into conversation with bots linked to that malicious third party.

According to a particular feature, the bot search interface is run from a messaging client installed on the first terminal.

In this way, the bot search interface is easily accessible to the user.

According to a particular feature, prior to receiving the request to launch the lookup operation or receiving the new request to launch the lookup operation, the bot search interface performs a step of displaying, via the user interface, a link to terms and conditions applying to the plurality of bots, said link being able to be activated via the user interface.

In this way, it is made easier for the user to access the terms and conditions applying to the plurality of bots, in compliance with the GDPR.

In another embodiment of the development, a computer program product that comprises program code instructions for implementing the above-mentioned method, in any of its various embodiments, when said program is executed on a computing machine (computer, processor, etc.) comprised in a terminal, is proposed.

In another embodiment of the development, a non-transitory computer-readable storage medium, storing a computer program comprising a set of instructions executable by a computing machine (computer, processor, etc.) to implement the above-mentioned method in any of its various embodiments, is proposed.

In another embodiment of the development, a first terminal configured to manage access to a plurality of bots by a user that comprises a computing machine configured to run a bot search interface performing the following operations is proposed:

during a first access by the user to the bot search interface:

receiving, via a user interface, an identifier associated with a target mobile terminal and an indication of the user's consent, said target mobile terminal belonging to the group comprising the first terminal if it is of the mobile type and at least a second mobile terminal different from the first terminal;

storing, on the first terminal, the identifier associated with the target mobile terminal and the indication of consent; and receiving, via the user interface, a request to launch a lookup operation with a view to selecting one of the bots and opening a conversation between the target mobile terminal and the selected bot;

during a subsequent access by the user to the bot search interface:

pre-displaying, via the user interface, the stored identifier associated with the target mobile terminal and indication of consent; and receiving, via the user interface, a new request to launch the lookup operation with a view to selecting one of the bots again and opening a conversation between the target mobile terminal and the newly selected bot.

This first mobile terminal is able to implement in all its embodiments the method for managing access to a plurality of bots just described.

BRIEF DESCRIPTION OF THE DRAWINGS

Other characteristics and advantages of the development will emerge upon reading the following description, provided as a non-restrictive example and referring to the annexed drawings, wherein.

DETAILED DESCRIPTION

In all the figures in this document, identical elements and steps are designated by the same reference number.

In the remainder of the description, the particular case where the identifier associated with a mobile terminal is a telephone number associated with the mobile terminal is considered as a non-restrictive example. This telephone number is, for example, the MSISDN (Mobile Station International Subscriber Directory Number) assigned to a SIM (Subscriber Identification Module) card inserted into the mobile terminal. The telephone number is for example in the format "+33ZABPQMCDU".

The present development is not limited to this example and also applies to any type of identifier associated with a mobile terminal, including but not limited to a SIP URI (Session Initiation Protocol—Uniform Resource Identifier) identity, for example in the format "sip:+33ZABPQMCDU@domain".

Figure 1:
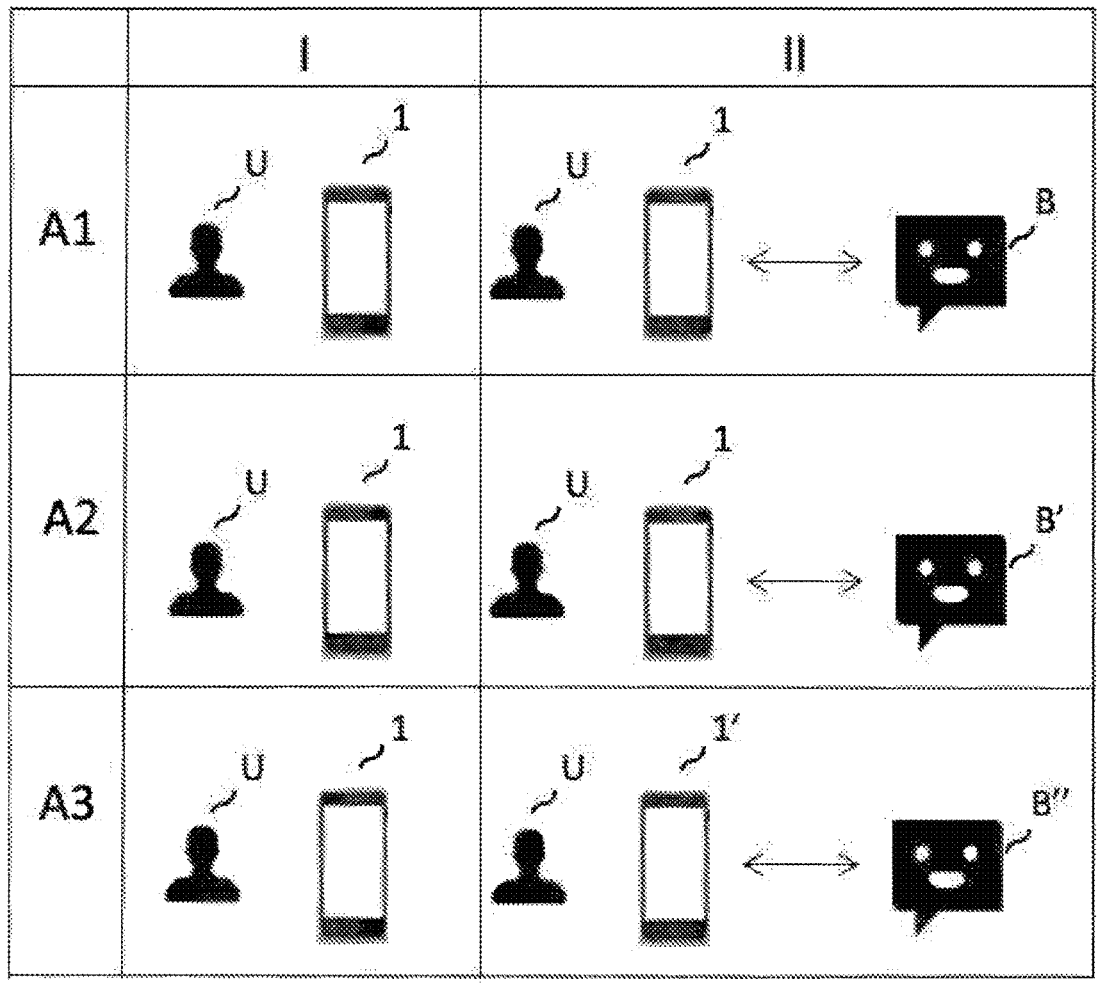
FIG. 1 illustrates a first embodiment of the development in which the telephone number is entered and stored during a first access by the user is that of a target mobile terminal identical to the first terminal on which the bot search interface is run.

A first embodiment of a solution for managing access to a plurality of bots by a user is now shown in relation to FIG. 1. As detailed hereafter, in this first embodiment, the telephone number entered and stored during a first access by the user is that of a target mobile terminal identical to a first terminal 1 on which the bot search interface is run.

It is therefore assumed that a first mobile terminal 1 (for example, a smartphone or a tablet) that runs a bot search interface is available to the user U. In a particular embodiment, the first mobile terminal 1 runs a first messaging client, which in turn runs the search interface. Either the first messaging client natively integrates the search interface, or it uses a browser (run by the first mobile terminal 1) to launch this search interface. "Messaging client" refers in particular but not exclusively to an SMS (Short Message Service) messaging client, an MMS (Multimedia Messaging Service) messaging client, an RCS (Rich Communication Services) messaging client or an instant messaging client (Facebook Messenger, WhatsApp, Skype, etc.).

As detailed hereafter (see FIG. 2), each time the user accesses the search interface, the latter allows, in a search phase (referenced I), on the one hand, to obtain user-specific information (telephone number of the target mobile terminal and consent) and, on the other hand, the search itself by launching a lookup operation (see details below, with FIGS. 8 to 15) with a view to selecting one of the bots and opening a conversation between the target mobile terminal and the selected bot. As detailed hereafter, the user-specific information is entered by the user during the first access to the bot search interface, and is then pre-displayed (for confirmation or modification) during each subsequent access to the bot search interface. Then, in a conversation phase (referenced II), a conversation is opened between the selected bot and the target mobile terminal, whose telephone number was obtained during the search phase I. To converse with the selected bot, the target mobile terminal runs a messaging client compatible with the communication channel associated with the selected bot (for example, the Skype communication channel associated with the Skype application or the Messenger communication channel associated with the Skype application). In FIG. 1, selected bots (one for each access to the search interface) are referenced B, B' and B".
These are, for example, chatbots (conversational bots), but
the development is not limited to this particular type of bot.

Thus, three successive accesses by the user U to the
search interface are illustrated in the example of FIG. 1:

during the first access (A1), the search interface allows, in
the search phase I, on the one hand, entering and storing
user-specific information (telephone number of the
target mobile terminal 1 and consent) and, on the other
hand, a search leading to the selection of the bot
referenced B. Then, in the conversation phase II, a
conversation is opened between the selected bot B and
the target mobile terminal 1;

during the second access (A2), the search interface
allows, in the search phase I, on the one hand, pre-
displaying (for confirmation or modification) the infor-
mation stored during the first access and, on the other
hand, a search leading to the selection of the bot
referenced B'. Then, in the conversation phase II, a
conversation is opened between the selected bot B' and
the target mobile terminal 1, assuming here that the
pre-displayed telephone number was confirmed during
the search phase I;

during the third access (A3), the search interface allows,
in the search phase 1, on the one hand, pre-displaying
(for confirmation or modification) the information
stored during the first access and, on the other hand, a
search leading to the selection of the bot referenced B".
Then, in the conversation phase II, a conversation is
opened between the selected bot B" and the target
mobile terminal 1', assuming here that the telephone
number of the target mobile terminal 1 has been
replaced by that of another target mobile terminal 1'
during the search phase I;

... (other accesses, not illustrated, may of course follow).

Figure 7:
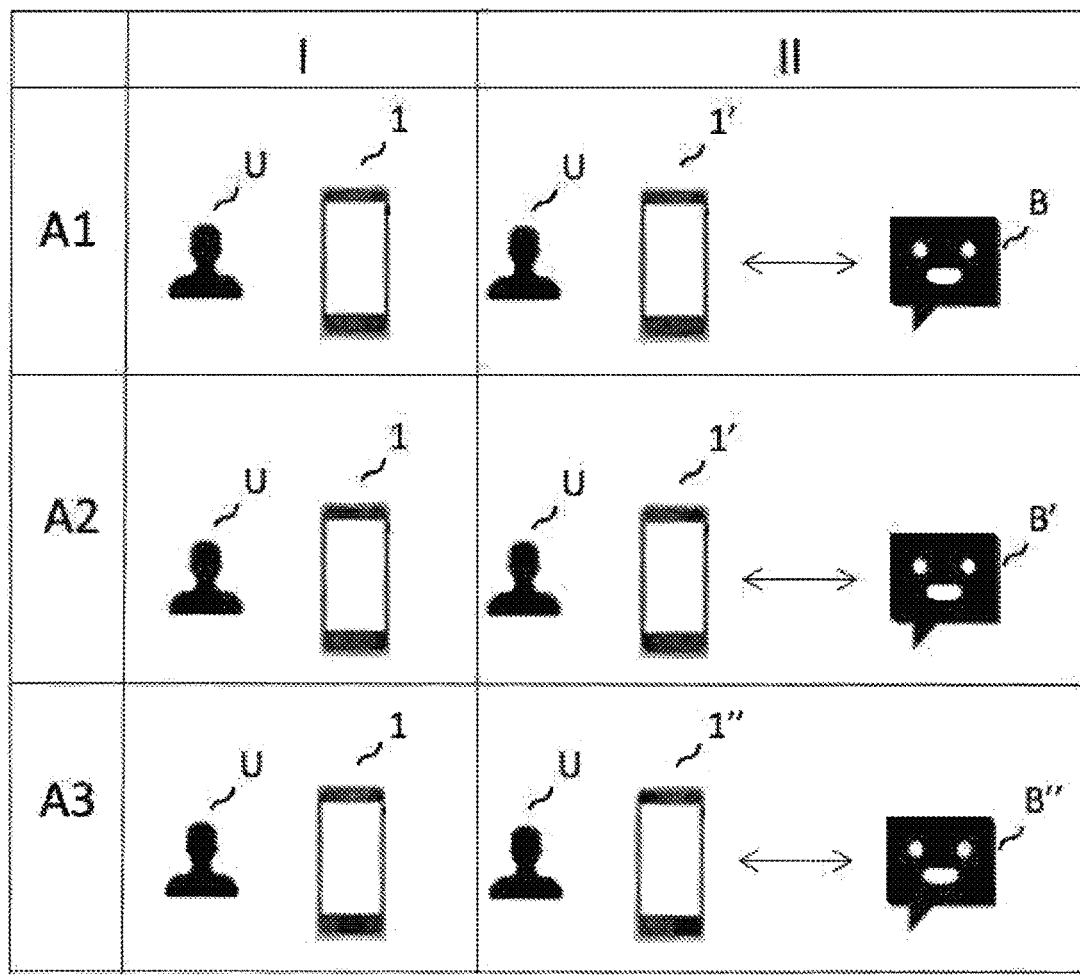
FIG. 7 illustrates a second embodiment of the development in which the telephone number entered and stored during a first access by the user is that of a target mobile terminal different from the first terminal on which the bot search interface is run.

FIG. 7 illustrates a second embodiment of a solution for
managing access to a plurality of bots by a user. It differs
from the first one in that the telephone number entered and
stored during the first access by the user is that of a target
mobile terminal 1' identical to a first mobile terminal 1 on
which the bot search interface is run.

Thus, three successive accesses by the user U to the
search interface are illustrated in the example of FIG. 7:

during the first access (A1), the search interface allows, in
the search phase I, on the one hand, entering and storing
user-specific information (telephone number of the
other target mobile terminal 1' and consent) and, on the
other hand, a search leading to the selection of the bot
referenced B. Then, in the conversation phase II, a
conversation is opened between the selected bot B and
the other target mobile terminal 1';

during the second access (A2), the search interface
allows, in the search phase I, on the one hand, pre-
displaying (for confirmation or modification) the infor-
mation stored during the first access and, on the other
hand, a search leading to the selection of the bot
referenced B'. Then, in the conversation phase II, a
conversation is opened between the selected bot B' and
the other target mobile terminal 1', assuming here that
the pre-displayed telephone number was confirmed
during the search phase I;

during the third access (A3), the search interface allows,
in the search phase I, on the one hand, pre-displaying
(for confirmation or modification) the information
stored during the first access and, on the other hand, a
search leading to the selection of the bot referenced B".
Then, in the conversation phase II, a conversation is
opened between the selected bot B" and yet another
target mobile terminal 1", assuming here that the tele-
phone number of the other target mobile terminal 1' has
been replaced by that of that yet other target mobile
terminal 1" during the search phase I;

... (other accesses, not illustrated, may of course follow).

Figure 2:
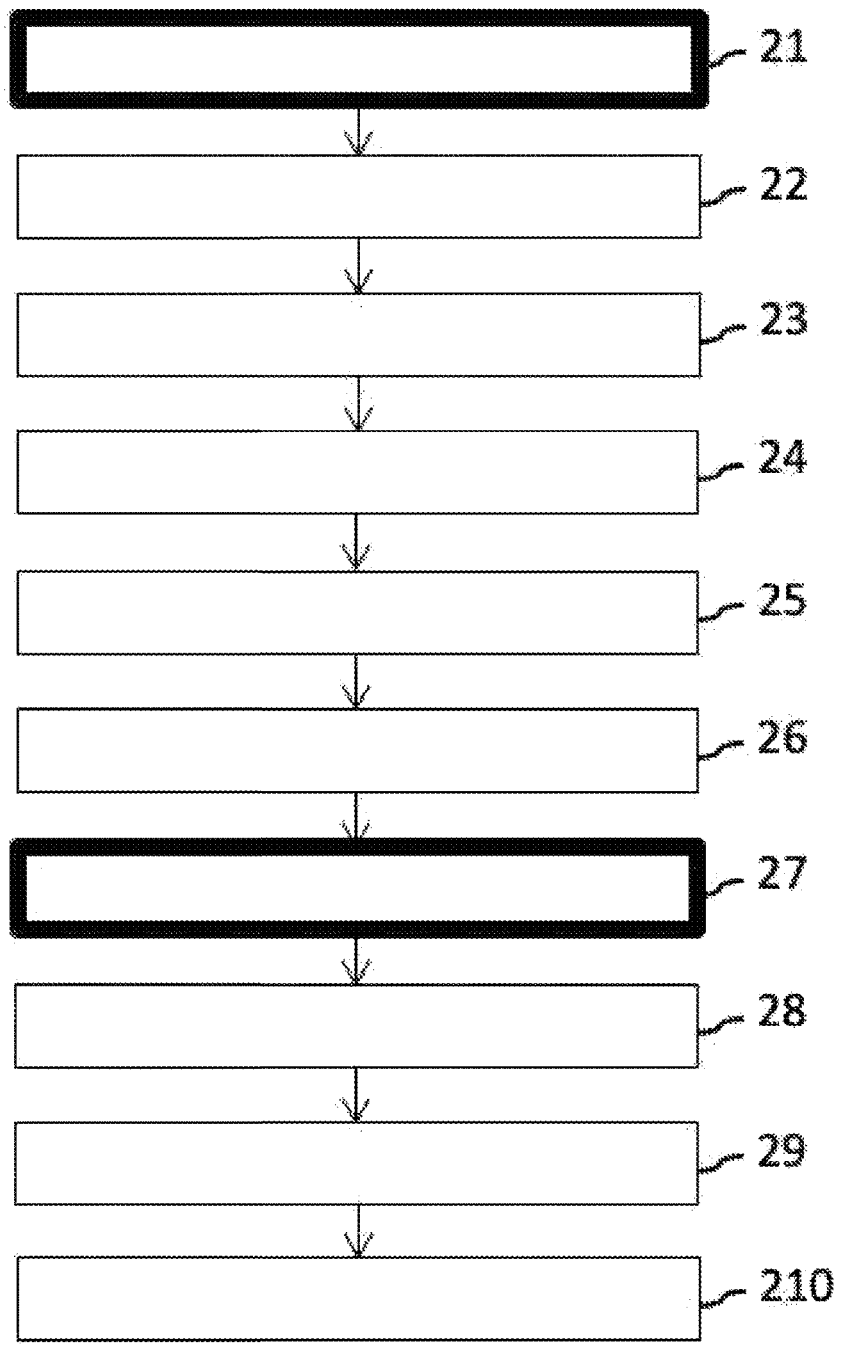
FIG. 2 shows a flowchart of a particular embodiment of the method according to the development.

FIG. 2 shows a flowchart of a particular embodiment of
the method according to the development. The different
steps (operations) performed by the bot search interface,
itself run by the first mobile terminal 1 in the example of
FIG. 1 in the search phase I, are detailed.

Figure 3:
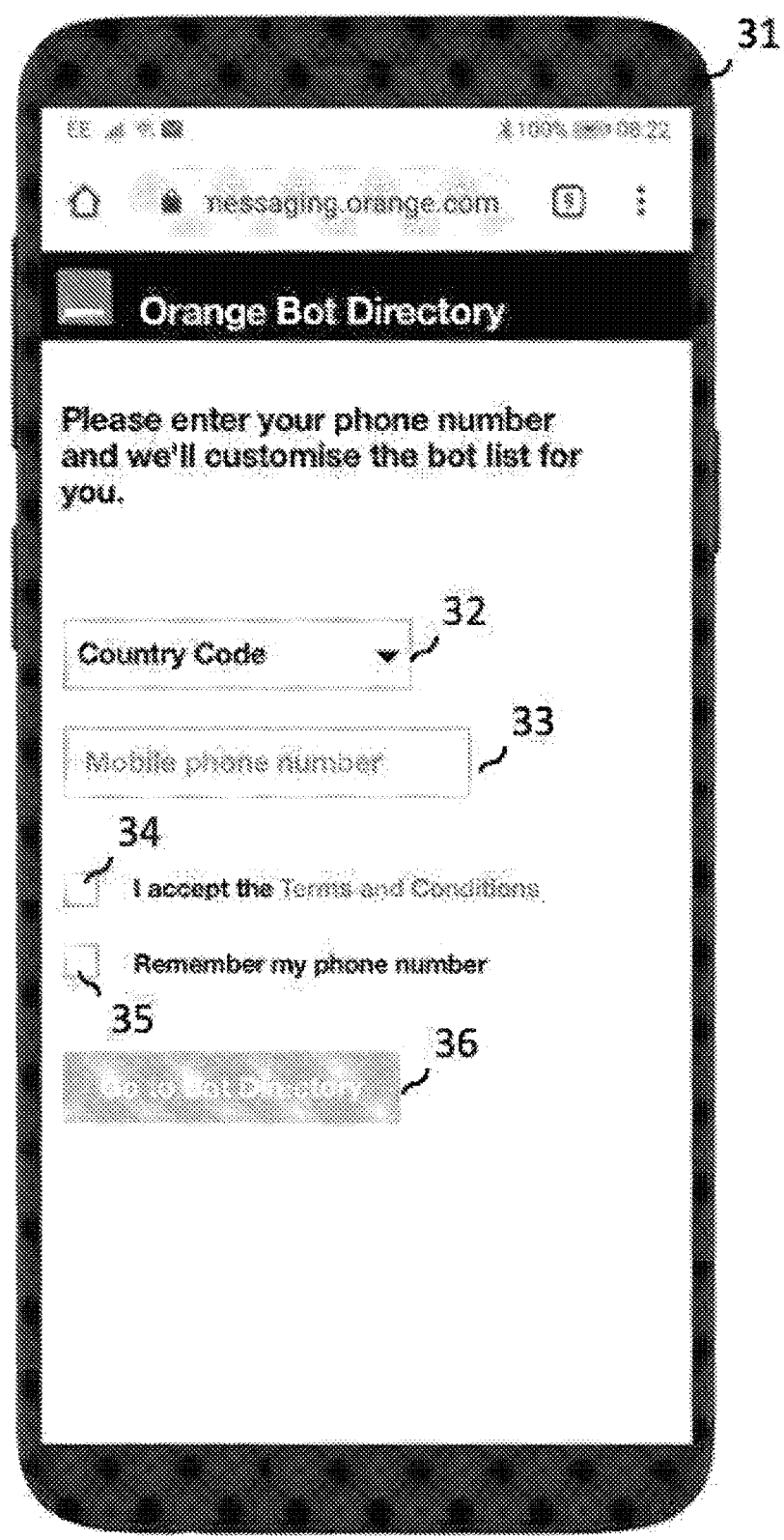
FIG. 3 shows an example of a first search interface window, during a first access by the user and before providing a telephone number of the target mobile terminal and a consent.

In a step 21, the search interface detects a first access by
the user. FIG. 3 shows an example of a first search interface
window 31 at this point, that is during a first access by the
user and before providing a telephone number (of the target
mobile terminal) and a consent. The following zones have
therefore not been filled in yet: country code zone ("Country
Code") 32, mobile phone number zone ("Mobile Phone
Number") 33, zone to accept the terms and conditions ("I
accept the Terms and Conditions") 34 (with a link to them),
zone to ask the search interface to remember the telephone
number once it has been entered ("Remember my phone
number") 35. Also, the button 36 to launch a lookup opera-
tion ("Go to Bot Directory") cannot be activated yet.

In a step 22, the search interface receives, via a user
interface, information entered by the user that is specific to
them: telephone number of the target mobile terminal and
indication of consent. The particular embodiment consid-
ered above is used again, in which the first mobile terminal
1 plays two roles: it runs the bot search interface and it is the
target mobile terminal.

In a step 23, the search interface displays, via the user
interface, the information entered in step 22 and a link to the
terms and conditions applying to the plurality of bots
(GDPR aspects). The link can be activated via the user
interface.

Figure 4:
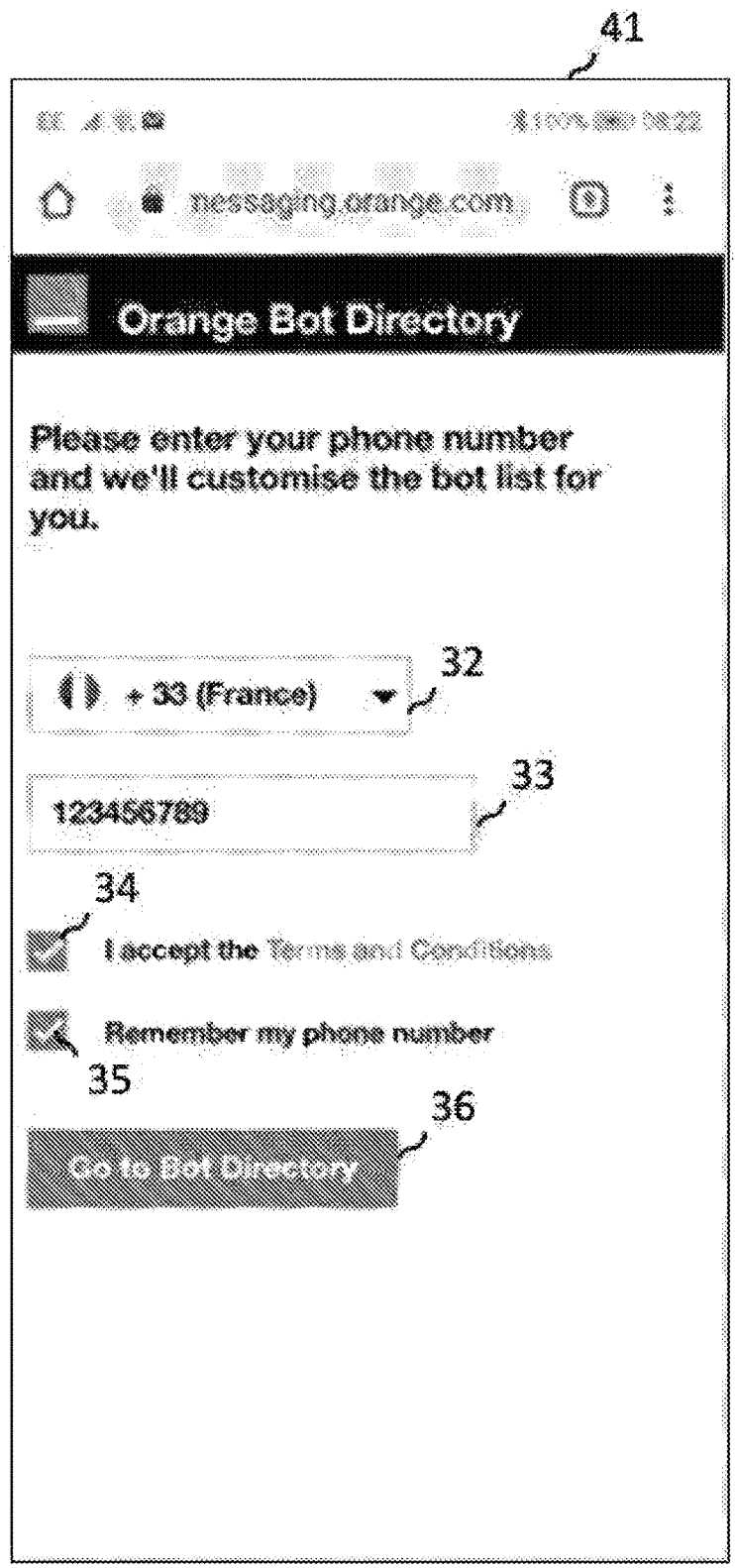
FIG. 4 shows an example of a second search interface window, during a first access by the user and after providing a telephone number of the target mobile terminal and a consent, in the case where the provided telephone number is valid.

FIG. 4 shows an example of a second search interface
window 41 at this point, that is during a first access by the
user and after providing a telephone number (of the target
mobile terminal) and a consent. The following zones have
therefore not been filled in yet: the code for France was
entered in the country code zone 32, a nine-digit number
("123456789") was entered in the mobile phone number
zone 33, the box was checked in the zone to accept the terms
and conditions 34, and the box was checked in the zone to
remember the phone number 35. In this example, it is
assumed that the provided telephone number is valid, so the
button 36 for launching a lookup operation can be activated.

Figure 5:
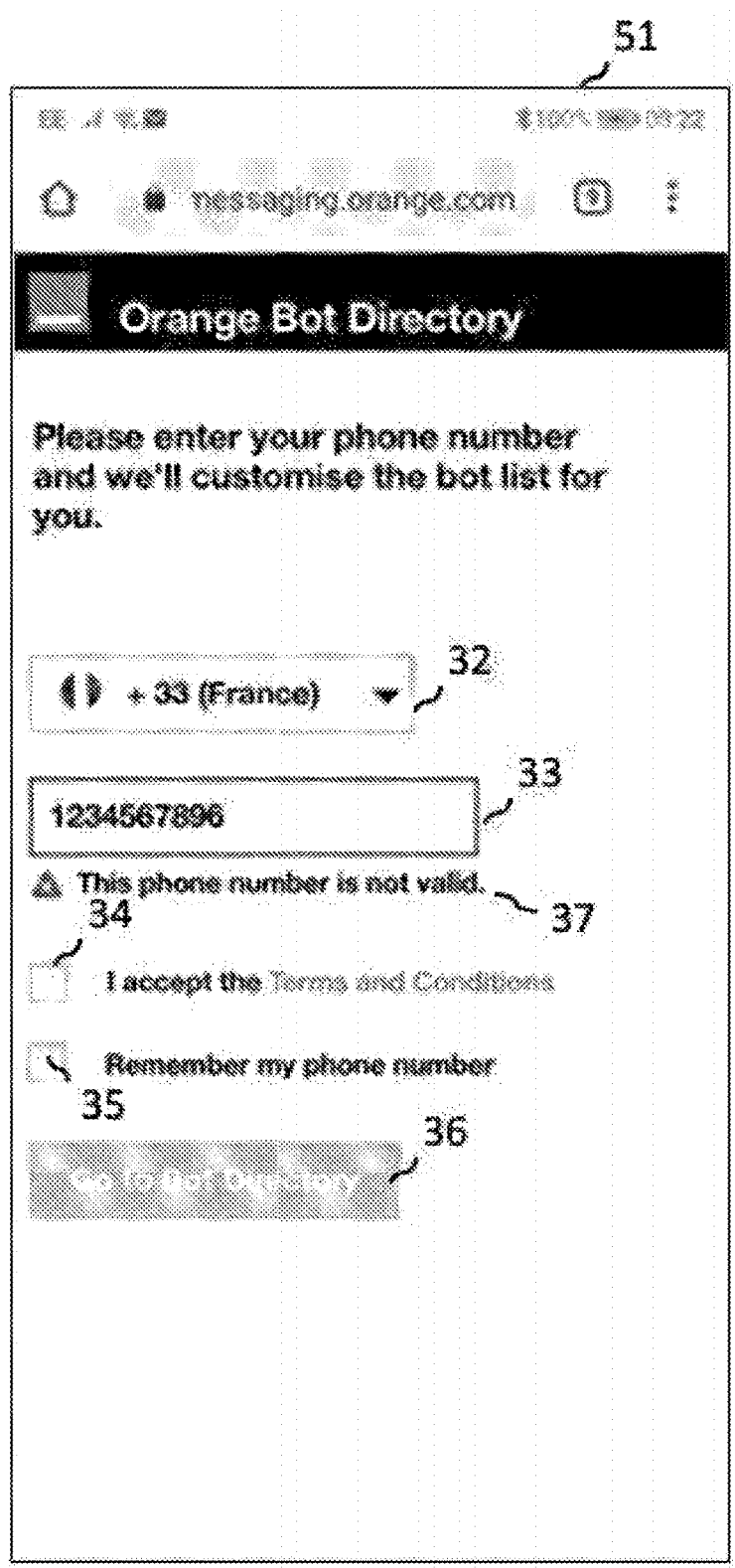
FIG. 5 shows an example of a third search interface window, during a first access by the user and after providing a telephone number of the target mobile terminal and a consent, in the case where the provided telephone number is not valid.

FIG. 5 shows an example of a third search interface
window 51 at this point, but unlike the case in FIG. 4, a
ten-digit number ("1234567896"), that is not correct, has
been entered into the mobile phone number zone 33. This
number is detected as invalid (see message referenced 37:
"This phone number is not valid") and as a result, the boxes
in zones 34 and 35 cannot be checked and the button 36 to
launch a lookup operation cannot be activated.

Back to FIG. 2, in a step 24, the search interface launches
a verification of the entered telephone number with a server
of a telecommunications operator. Only a positive verifica-
tion of the entered telephone number allows steps 25 and 26
to be performed. The verification principle can take various
forms (for example, a one-time, time-limited code solution
(OneTimePassword), delegated authentication, etc.), that are
well known to those skilled in the art and therefore not
described in detail here.

In step 25, the search interface stores the information
entered by the user on the first mobile terminal 1. The storage is for example carried out in storage areas known to those skilled in the art (local storage, session storage, cookies, etc.). The principle of local storage of the information entered by the user makes it possible to manage abuse or security related to "spoofing". The storage of user-related information remains associated with the terminal performing the search.

In step 26, the search interface receives, via the user interface, a request to launch a lookup operation (see details below, with FIGS. 8 to 15) with a view to selecting one of the bots and opening a conversation between the target mobile terminal and the selected bot.

In a step 27, the search interface detects a subsequent access by the user.

Figure 6:
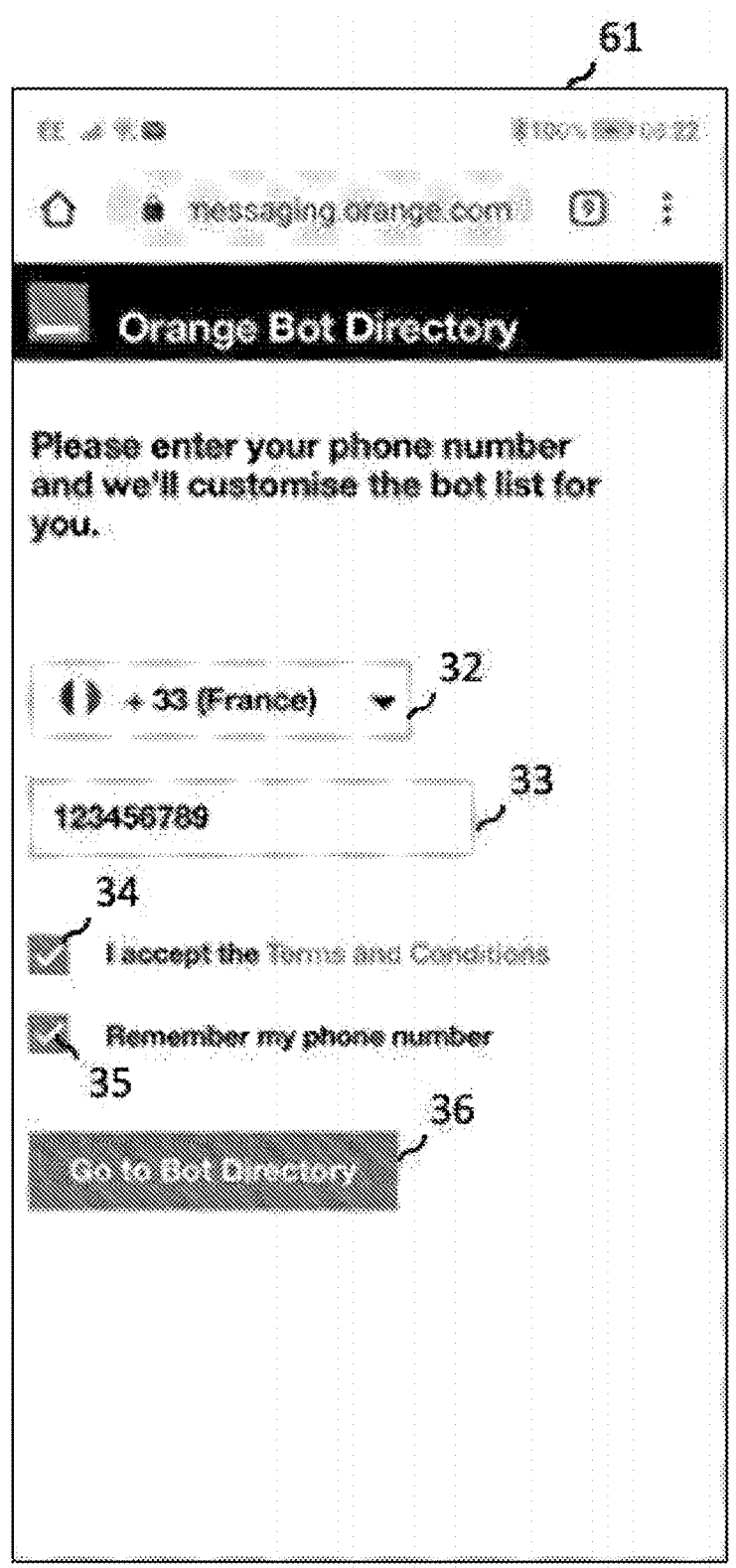
FIG. 6 shows an example of a fourth search interface window, during a subsequent access by the user and after pre-displaying the telephone number of the target mobile terminal and the consent.

In a step 28, the search interface pre-displays, via the user interface, the information stored in step 25 (telephone number of the target mobile terminal and indication of consent), as well as the above-mentioned link to the terms and conditions (see step 23). FIG. 6 shows an example of a fourth search interface window 61 at this point, that is during a subsequent access by the user and after pre-displaying the telephone number of the target mobile terminal and the consent. Zones 32 to 35 have therefore been automatically filled in. In this example, as in the case of FIG. 4, the provided telephone number being valid, the button 36 for launching a lookup operation can be activated.

In a step 29 performed only if the user wants to modify the pre-displayed telephone number, the search interface receives, via the user interface, a modification of the pre-displayed telephone number:
  either by the telephone number of another target mobile terminal 1';
  or by another telephone number of the target mobile terminal 1.

In a step 210, the search interface receives, via the user interface, a new request to launch the lookup operation (see details below, with FIGS. 8 to 15) with a view to selecting again one of the bots and opening a conversation between the selected bot and:
  the target mobile terminal 1, with the pre-displayed and unmodified number, or
  the target mobile terminal 1, but with the number modified in step 29, or
  the other target mobile terminal 1', with the number modified in step 29.

Figure 8:
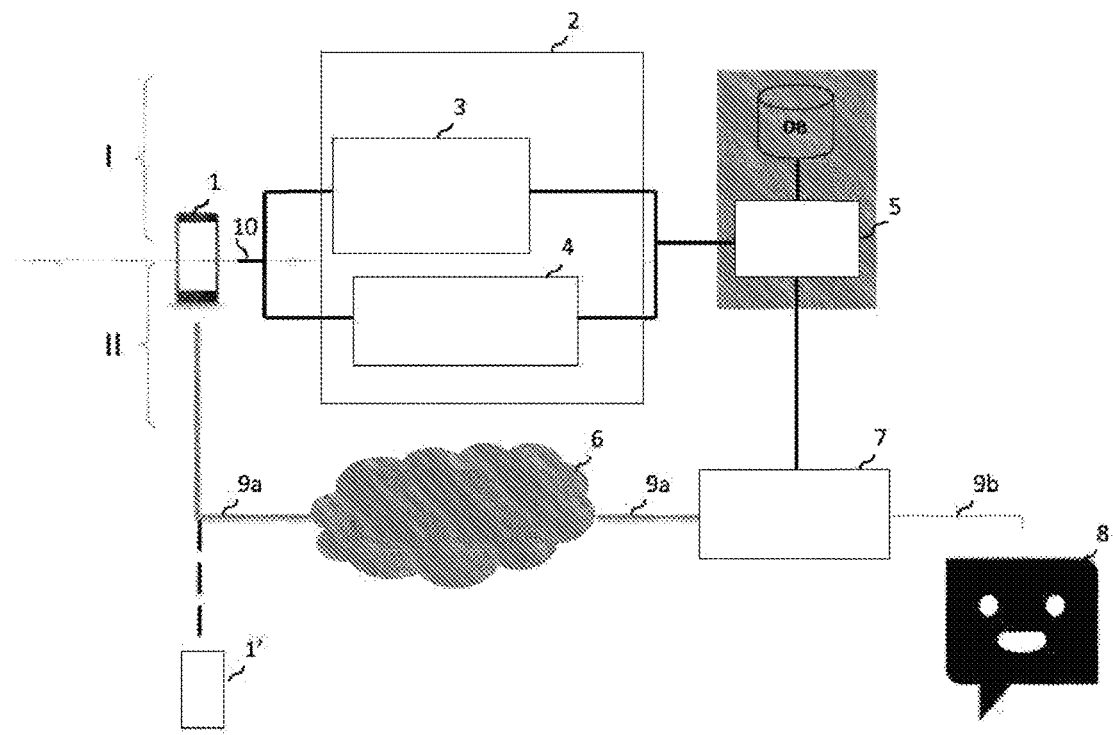
FIG. 8 illustrates a system for a particular embodiment of the lookup operation (launched in steps 26 and 210 of FIG. 2)

A system for a particular embodiment of the lookup operation launched in steps 26 and 210 of FIG. 2 is now show in relation to FIG. 8.

In the example of FIG. 8, the system comprises:
  at least the mobile terminal 1 that, in the particular embodiment considered and as already discussed above, plays two roles: it is the terminal (referred to above as the "first terminal") that runs the bot search interface and it is also the target mobile terminal; it hosts one or more compatible messaging clients each with its own communication channel;
  a set 2 of front-end servers providing bot discovery functions when they receive search requests from the mobile terminal 1 as the terminal running the bot search interface, via a search channel 10 independent of the communication channel(s) with which the messaging client(s) installed on the mobile terminal 1 is/are compatible. In the illustrated example, the set 2 of front-end servers comprises at least one text search server 3 and at least one graphic search server 4. These servers 3 and 4 also make it possible to transmit to a mediation server 7, via a background server 5, the information of the telephone number of the mobile terminal 1 (since it is the target mobile terminal), for linking the selected bot to the user of the mobile terminal 1;
  at least one back-end server 5 cooperating with a database DB (itself containing data relating to a plurality of bots, with for example for each an identifier, a logo, descriptive information, etc.); the back-end server 5 is queried by the search servers 3 and 4 so that the latter can respond, via the search channel 10, to the search requests transmitted by the mobile terminal 1;
  a communication network 6 on which a selected communication channel 9a is established, following a search that allowed to select a bot 8 and this communication channel 9a that is associated with it;
  at least one bot 8 (the one selected at the end of the above-mentioned search) with which a user of the mobile terminal 1 (since it is the target mobile terminal) can communicate; in the remainder of the description, it is assumed that it is a chatbot (conversational robot), but the development is not limited to this particular type of bot; and
  at least one mediation server 7, carrying out an adaptation between the selected communication channel 9a, that connects the mobile terminal 1 (since it is the target mobile terminal) and the mediation server 7, and a substitution channel 9b, that connects the mediation server 7 to the chatbot 8. For this purpose, the mediation server 7 communicates with the back-end server 5.

The brace referenced 1 designates the branch of equipment used in the case of a text search and comprising the following elements: the mobile terminal 1, the text search server 3, the back-end server 5 and the database DB.

The brace referenced II designates the branch of equipment used in the case of a graphic search and comprising the following elements: the mobile terminal 1, the graphic search server 4, the back-end server 5 and the database DB.

FIG. 1 also illustrates an embodiment variant in which the terminal 1, that in this case can be of the fixed or mobile type, runs the bot search interface, but does not play the role of the target mobile terminal. It is another mobile terminal, referenced 1' in FIG. 1, that is the target mobile terminal and that therefore communicates with the selected bot 8, via the selected communication channel 9a.

Figure 15:
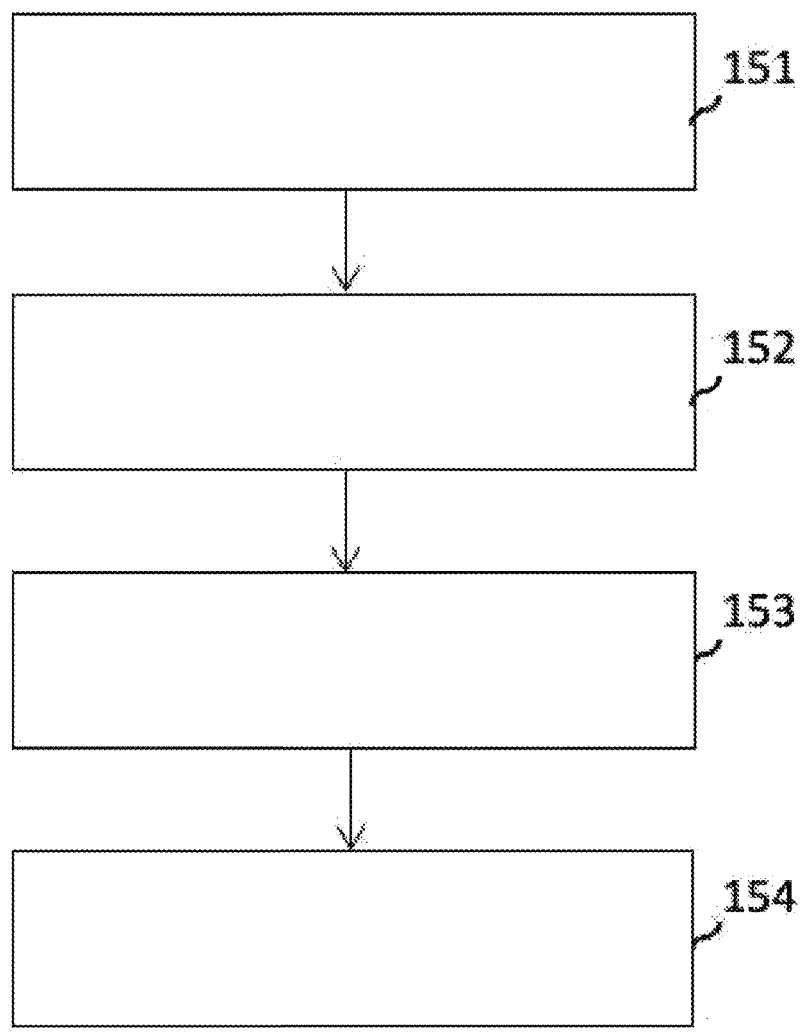
FIG. 15 shows a flowchart of a particular embodiment of the lookup operation, for operations performed by the first terminal.

FIG. 15 shows a flowchart of a particular embodiment of the bot lookup operation according to the development, for operations performed by the first mobile terminal 1 ("first terminal"). The particular embodiment considered above is used again, in which the mobile terminal 1 plays two roles, that is it runs the bot search interface and it is the target mobile terminal.

In a step 151, the mobile terminal 1 transmits at least one search request to at least one of the bot search servers 3 and 4, via the search channel 10 that is independent of the communication channel(s) 9a with which the messaging client(s) installed on the mobile terminal 1 is/are compatible. Various types of search request can be considered: search request by keyword(s), search request by category(ies) or request to start a conversation with a search bot (for example, a search chatbot offering a service for searching other chatbots, performed by its own mechanics not described in this document).

In a step 152, the mobile terminal 1 receives, via the search channel 10 and from the bot search server(s) 3 and 4, a search result comprising at least one pair comprising a bot and an associated communication channel. It is for example a list of pairs comprising each a chatbot (represented by example by its identifier and/or its logo) and an associated communication channel. The same chatbot can be mentioned in different pairs, each time with a separate communication channel. The result can also sometimes include a single pair. The various bots forming the search result can be sorted and presented according to various configurable criteria (sorting and prioritisation based on branding, brand sponsorship, geolocation criteria, etc.).

In a step 153, the mobile terminal 1 selects, from the search result, a pair comprising a bot and an associated communication channel. In the example of FIG. 8, it is assumed that the selected pair comprises the chatbot 8 and the communication channel 9a (it is for example the "Orange Football Club" chatbot with which the Facebook Messenger application, run on the mobile terminal 1, will communicate using the Messenger communication channel). In a particular implementation, the selection made in step 153 (selection of a pair comprising a bot and an associated communication channel) is a function of a choice information received by the mobile terminal 1 via a user interface. In a variant, the selection made in step 153 is a function of an automatic choice made by the mobile terminal 1 according to at least one choice criterion (for example, choice of a pair comprising a communication channel with which a messaging client in use is compatible, or choice of a pair comprising a communication channel with which a default messaging client is compatible).

In a step 154, the mobile terminal 1 initiates the opening of a conversation between the mobile terminal 1, as the target mobile terminal, and the bot 8 of the selected pair, using the communication channel 9a of the selected pair (in the above-mentioned example, the Messenger communication channel with which the Facebook Messenger application is compatible). In the above-mentioned embodiment variant, in which the terminal 1 runs the bot search interface, but the target mobile terminal is another mobile terminal 1', step 154 is slightly different: the mobile terminal 1 initiates the opening of a conversation between the target mobile terminal 1' and the bot 8 of the selected pair, using the communication channel 9a of the selected pair.

In a particular implementation illustrated in FIG. 8, the opening of the conversation with the bot 8 of the selected couple is performed using the mediation server 7, which carries out an adaptation between, on the one hand, the communication channel 9a of the selected pair (first channel located between the target mobile terminal (mobile terminal 1 or mobile terminal 1') and the mediation server 7), and on the other hand, the substitution channel 9b (second channel located between the mediation server 7 and the chatbot 8 of the selected pair). The mediation server 7 initiates the conversation by sending a message, via the selected communication channel 9a, to the target mobile terminal (terminal 1 or terminal 1') of the user. The mediation server 7 previously obtained the telephone number of the target mobile terminal and an identifier of the chatbot 8, thanks to the data exchanged with the search servers 3 and 4 and with the back-end server 5 (see steps 151 to 153).

In a variant, the opening of the conversation is performed without the mediation server 7, that is with a communication channel connecting the target mobile terminal (mobile terminal 1 or mobile terminal 1') and the chatbot 8. The target mobile terminal previously obtained an identifier of the chatbot 8 allowing to reach it directly, thanks to the data exchanged with the search servers 3 and 4 and with the back-end server 5 (see steps 151 to 153).

One disadvantage of this variant is that the chatbot 8 is developed specifically for one communication channel and is only accessible through it. For accessibility via other communication channels, it is therefore necessary to develop several chatbots having essentially the same functionality but each specific to a particular communication channel. The embodiment with the mediation server 7 is precisely intended to overcome this disadvantage, by allowing the selected bot 8 to be in conversation with a messaging client run on the target mobile terminal, that is not necessarily compatible with the communication channel 9b for which the bot 8 has been developed (the adaptation to this communication channel 9b being carried out by the mediation server 7).

In a first embodiment, the mobile terminal 1 runs a messaging client (hereinafter referred to as "first messaging client") that natively integrates the search interface that performs steps 151 to 153.

In a second embodiment, the mobile terminal 1 runs a messaging client (also hereinafter referred to as "first messaging client") that does not natively integrates the above-mentioned search interface, but uses a browser run by the mobile terminal to launch this search interface that performs steps 151 to 153.

If the communication channel of the pair selected in step 153 is different from the communication channel with which the first messaging client is compatible, the mobile terminal 1, as the target mobile terminal, opens the conversation using a second messaging client compatible with the communication channel of the selected pair. For example, if the first messaging client in the above-mentioned sense is the Skype application (compatible with the Skype communication channel) and if the pair selected in step 153 comprises the "Orange Football Club" chatbot 8 and the Messenger communication channel, then the mobile terminal 1 performs, in step 154, the opening of the conversation with the chatbot 8 using the Skype application which constitutes the second compatible messaging client in the above-mentioned sense.

Figure 9:
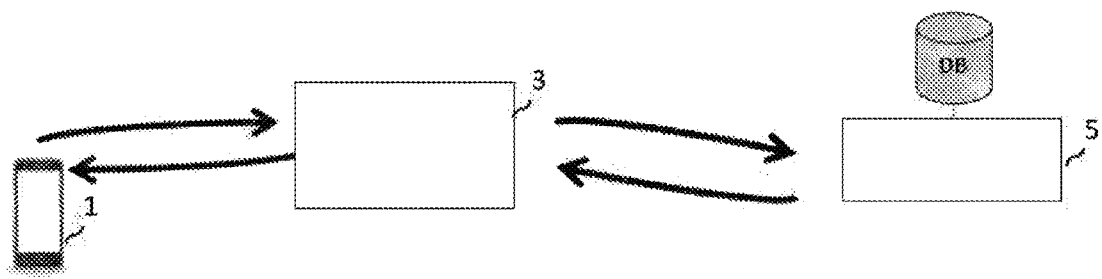
FIG. 9 illustrates a search by keyword(s) in the system of FIG. 8.

FIG. 9 illustrates a search by keyword(s) (also referred to as "text search") in the system of FIG. 8. The mobile terminal 1 transmits to the text search server 3 (via the search channel 10, see FIG. 8) a search request comprising at least one keyword provided by the user via a user interface of a messaging client run by the mobile terminal 1. To answer this request, the text search server 3 queries the back-end server 5 (which cooperates with the database DB) and obtains in return answer elements allowing to build a list of bots in relation with the provided keyword. The text search server 3 returns to the mobile terminal 1 an answer comprising this list of bots, specifying for each an associated communication channel. In other words, the answer comprises a list of pairs, each comprising a bot and an associated communication channel.

Figure 10:
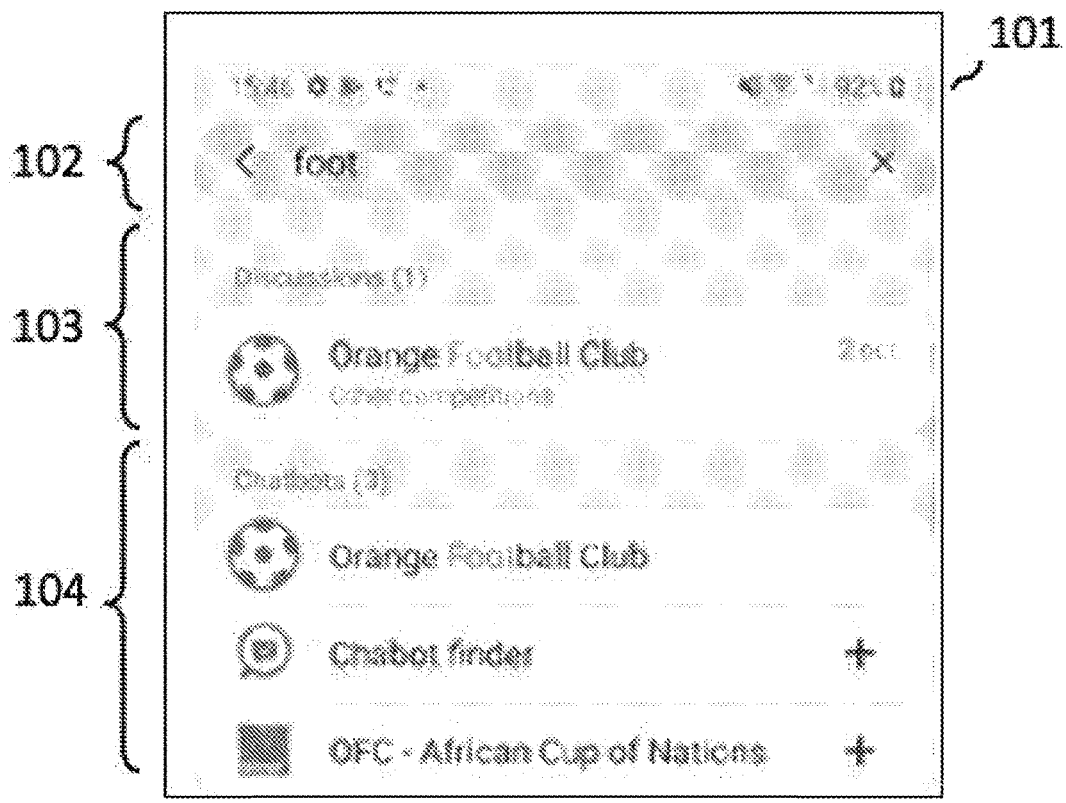
FIG. 10 shows an example of a user interface window displaying the result of a search by keyword(s)

FIG. 10 shows an example of a user interface window 101 displaying the result of a search by keyword(s). It is assumed in this example that the user searched for a bot related to the interest "football". From the messaging client run on their mobile terminal 1, the user has, for example, entered the keyword "football" (see the search zone referenced 102). The search request generated was, for example, in the format described in the GSMA RCC.07 document (request example: https://domain/?ho= . . . &client_version= . . . &client_vendor= . . . &start=0&num=10&i= . . . &q=foo t). The request was sent to the text search server 3 that returned it a list of chatbots related to the keyword "foot". This list of chatbots is displayed to the user, within the window 101, in the result area referenced 104. In this example, the communication channel associated with each chatbot in the list is not displayed in the area referenced 104. This is because, for example, only chatbots whose associated communication channel is compatible with the currently used messaging client (to perform the search) or with at least one of the other messaging clients installed on the terminal are displayed. Another explanation is that the display of the communication channels associated with the listed chatbots requires an action by the user via the user interface (for example, pressing a "+" button displayed near an identifier and/or a logo of a given chatbot enables the associated communication channel to be displayed, or even a plurality of associated channels if the chatbot can be accessed via the mediation server 7). In the case where several communication channels are displayed, if the user chooses a channel that is not the one associated with the currently used messaging client, then the mobile terminal 1 switches to another messaging client associated with the chosen communication channel, thus allowing the opening of a conversation with the given chatbot. In the illustrated example, the window 101 has another result area, referenced 103, that lists the discussions relating to the keyword "foot".

Figure 11:
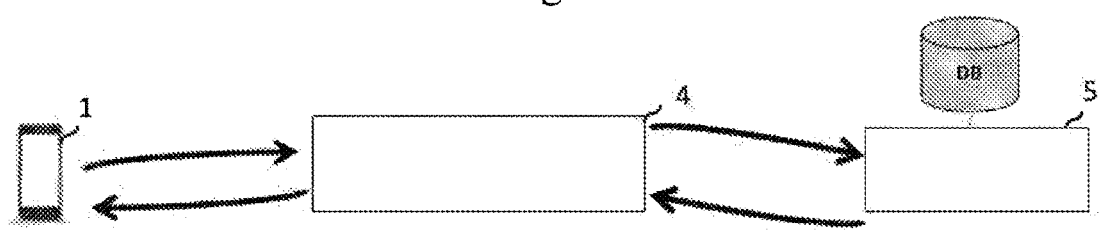
FIG. 11 illustrates a search by category(ies) in the system of FIG. 8.

FIG. 11 illustrates a search by category(ies) (also referred to as "graphic search") in the system of FIG. 8. The mobile terminal 1 transmits to the graphic search server 4 (via the search channel 10, see FIG. 8) a search request comprising at least one category provided by the user via a user interface of a messaging client run by the mobile terminal 1. To answer this request, the graphic search server 4 queries the back-end server 5 (that cooperates with the database DB) and obtains in return answer elements allowing to build a list of bots in relation with the provided category. The graphic search server 4 returns to the mobile terminal 1 an answer comprising this list of bots, specifying for each an associated communication channel.

Figure 12:
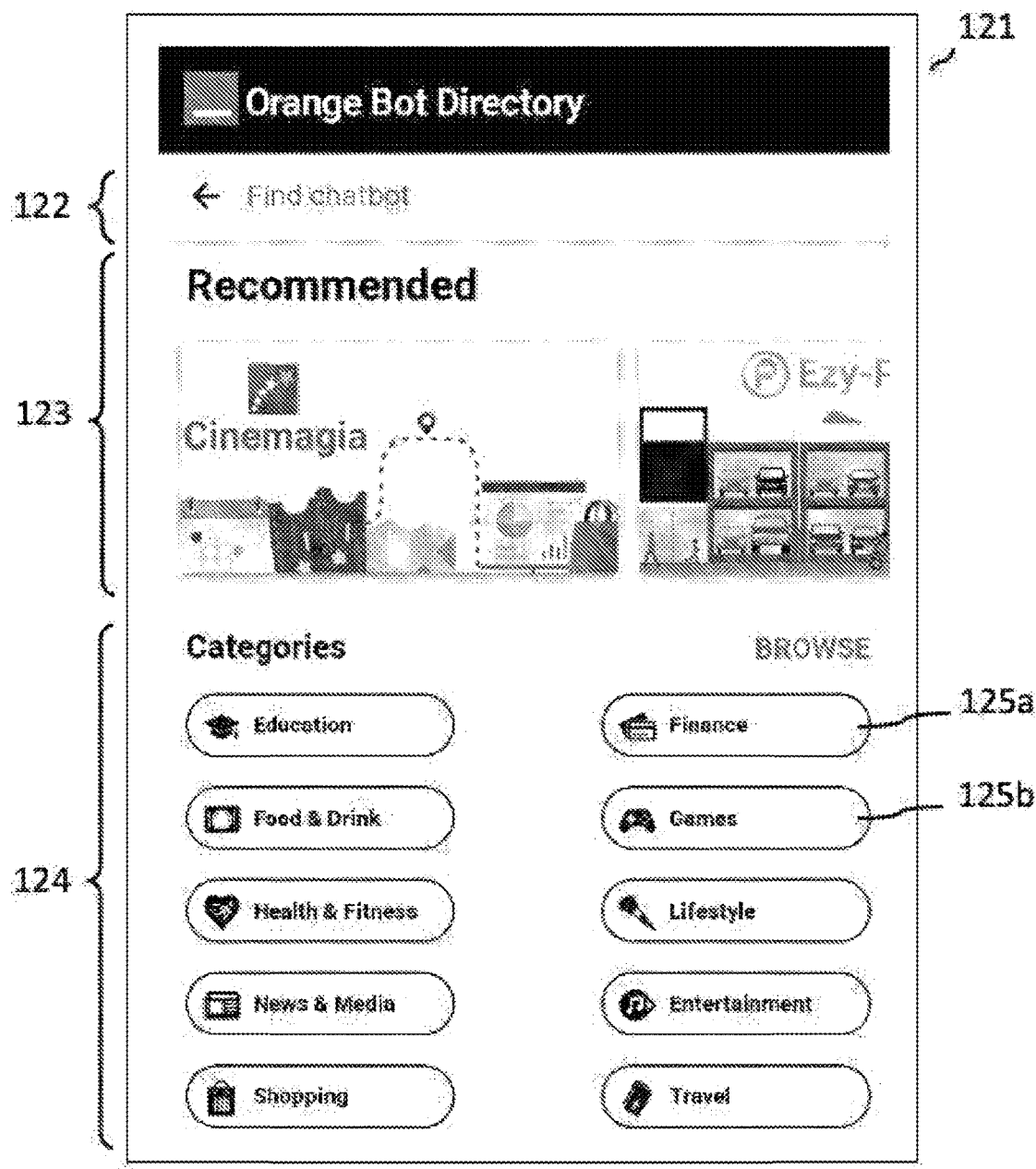
FIG. 12 shows an example of a user interface window inviting a user to choose a category.
Figure 13:
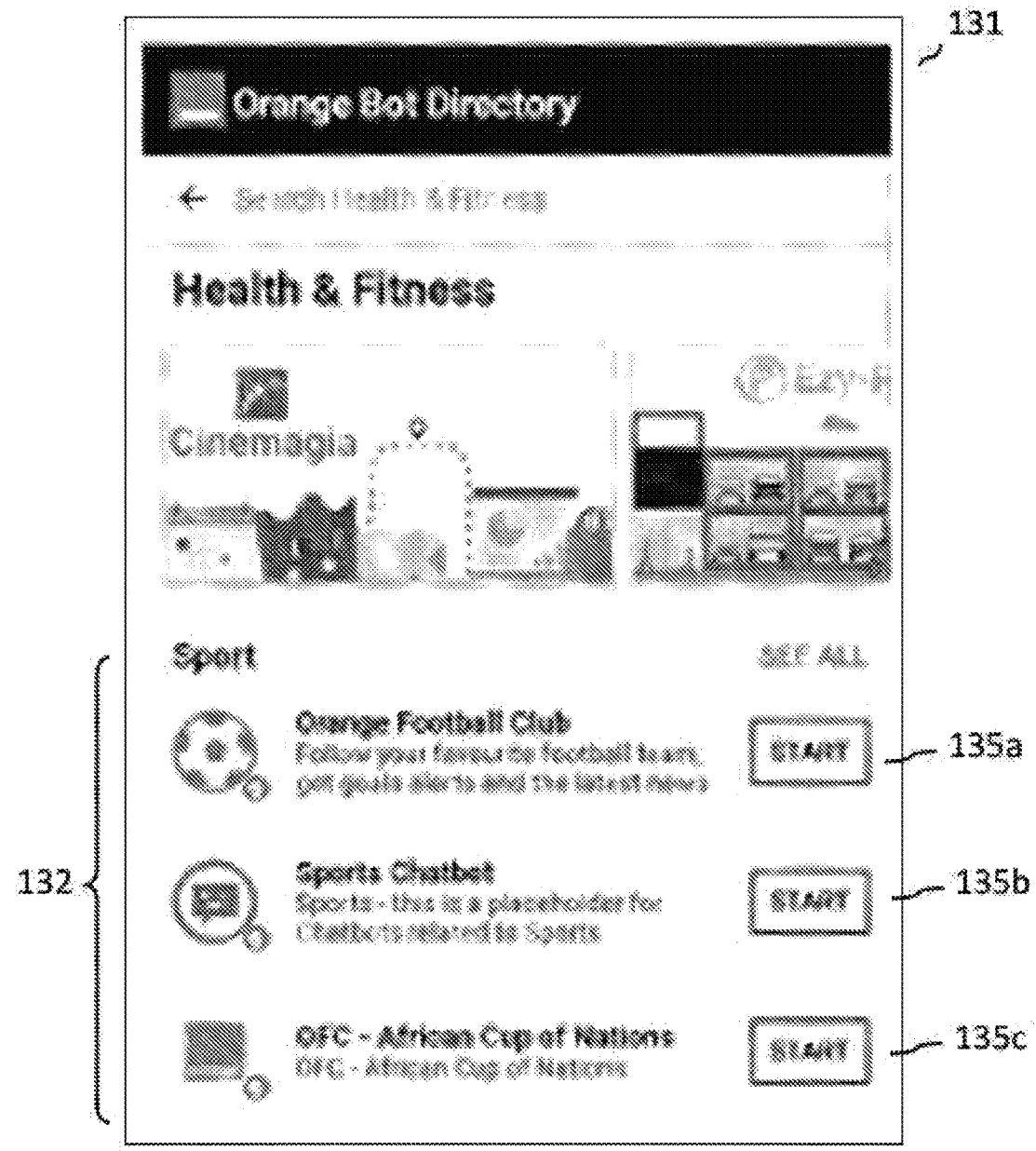
FIG. 13 shows an example of a user interface window displaying the result of a search by category(ies)

An embodiment of a search by category(ies) is now presented in relation to FIGS. 12 and 13. From its messaging client run on its mobile terminal 1, the search interface opens a page (user interface window referenced 121 in FIG. 12) that provides an example of a category-based organisation for performing the bot search. A recommendation area 123 ("Recommended") allows sponsored bots to be reached directly. The user can refine their search by selecting a category among those (125a, 125b, etc.) listed in the area referenced 124, or by entering a keyword in the search area referenced 122 and comprising an invitation to enter a keyword ("Find chatbot").

In the illustrative case where the user selected the "Health & Fitness" category, the next page that is displayed (user interface window referenced 131 in FIG. 13) has a result area referenced 132. In the latter, a list of chatbots is displayed to the user. Each line corresponds to a chatbot and comprises a logo, a name and a brief description of the chatbot, as well as a "Start" button, referenced 135a, 135b, 135c in FIG. 13. In this example, and as in the other example discussed above (see FIG. 10), the communication channel associated with each chatbot in the list is not displayed.

Figure 14:
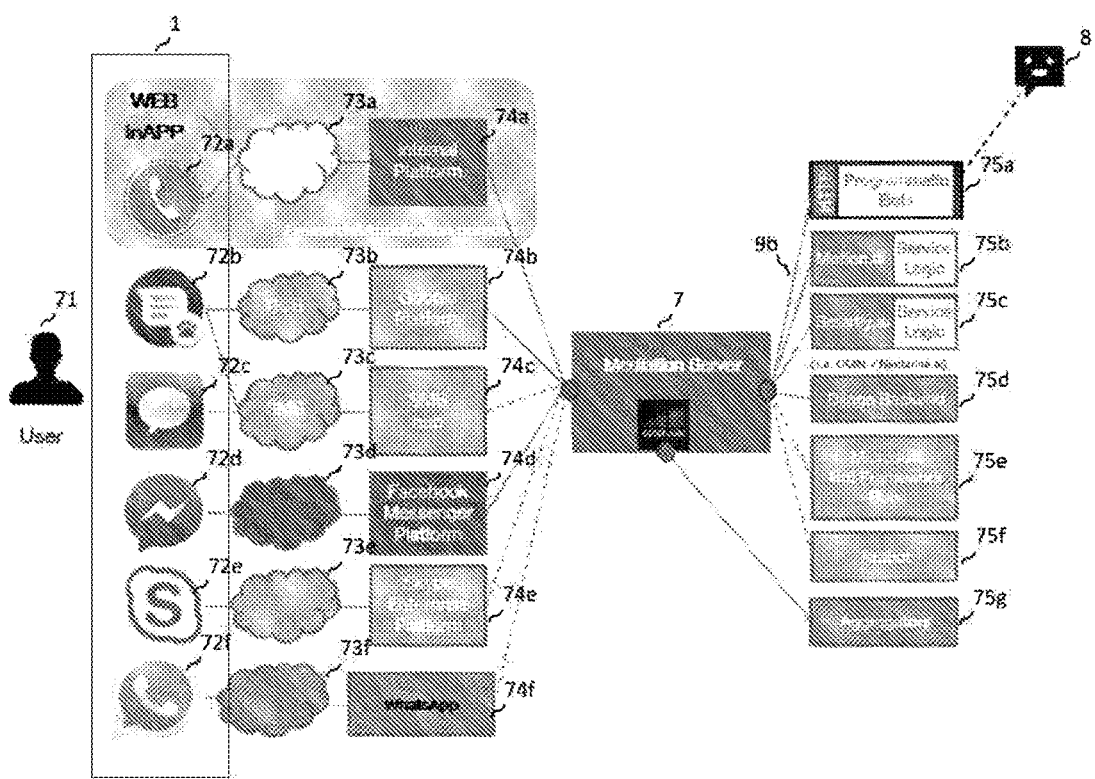
FIG. 14 illustrates the general principle of a mediation server of the system of FIG. 8.

FIG. 14 illustrates the general principle of a mediation server 7. The particular embodiment considered above is used again, in which the mobile terminal 1 plays two roles: it runs the bot search interface and it is the target mobile terminal.

It is assumed that the mobile terminal 1 is available to a user 71 on which are installed:
a search interface 72a, implementing steps 151 to 154 of FIG. 15 and using a search channel 73a and an associated platform 74a;
as well as one or more messaging clients (RCS 72b, SMS 72c, Messenger 72d, Skype 72e, WhatsApp 72f, etc.), each using its own communication channel (73b to 73f) and an associated communication platform (74b to 74f).

On a first side, the mediation server 7 is connected to each of the above-mentioned channels (73a to 73f) via the associated communication platform (74a to 74f).

On a second side, the mediation server 7 is connected, via substitution channels 9b, to a plurality of hosting platforms (75a to 75g), each hosting bots. In the illustrated example, the hosting platform 75a hosts in particular the chatbot 8 of FIG. 8 and is connected, via the substitution channel 9b, to the mediation server 7.

The role of the mediation server 7 is to perform a channel adaptation, so that each bot, hosted on one of the hosting platforms (75a to 75g), can communicate, via at least one (and preferably several) of the communication channels (73b to 73f), with at least one (and preferably several) of the messaging clients (72b to 72f) installed on the mobile terminal 1 as the target mobile terminal. It avoids the complexity of having to develop and implement as many bots as there are communication channels (73b to 73f) to be reached.

Figure 16:
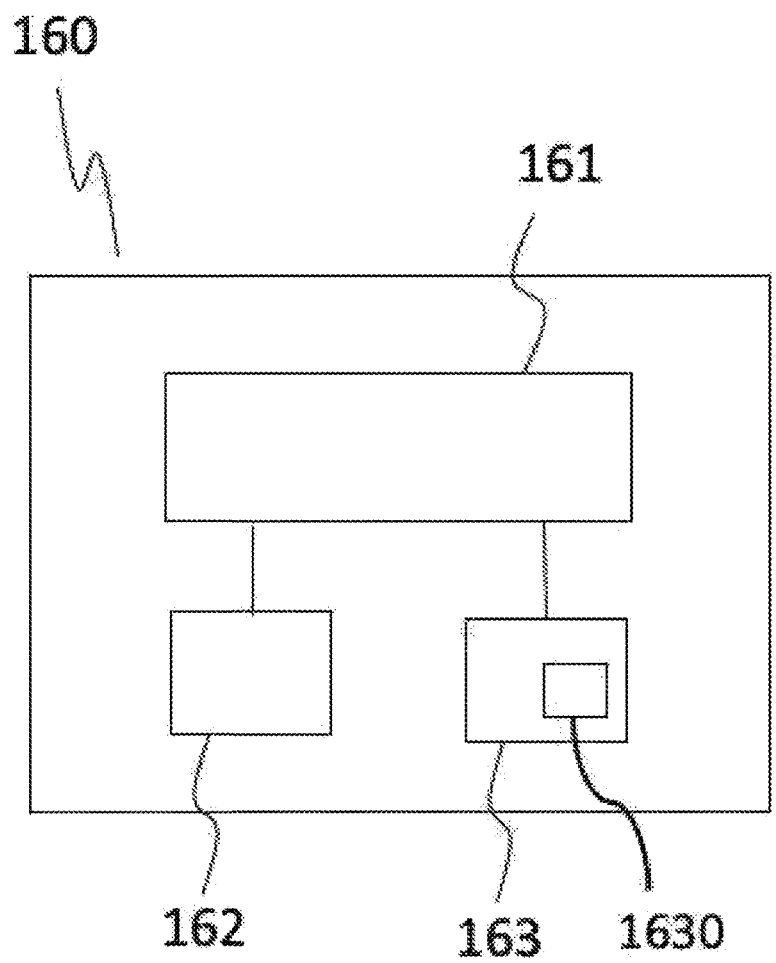
FIG. 16 shows the structure of the above-mentioned terminals, according to a particular embodiment of the development.

FIG. 16 shows the structure 160 of the above-mentioned terminals (1, 1', 1"), the search servers 3 and 4, the back-end server 5 and the mediation server 7 according to a particular embodiment of the development.

This structure 160 comprises a random-access memory 161 (a RAM memory, for example), a read-only memory 163 (a ROM memory or a hard disk, for example) and a processing unit 161 equipped for example with a processor controlled by a computer program 1630 stored in the read-only memory 163. At initialisation, the code instructions of the computer program 1630 are for example loaded into the random-access memory 161 before being executed by the processor of the processing unit 161.

This FIG. 16 only shows a particular one of several possible ways of realising the above-mentioned devices (1, 1', 1" 3, 4, 5 and 7). Indeed, they may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case of an implementation on a reprogrammable computing machine, the corresponding program (that is the sequence of instructions) can be stored in a removable (such as, for example, a floppy disk, CD-ROM or DVD-ROM) or non-removable storage medium, this storage medium being partially or totally readable by a computer or a processor. As a variant, the storage medium can be a transmissible medium such as an electrical or optical signal, that can be carried via an electrical or optical cable, by radio link, by optical link or by other means.

Alternatively, each storage medium can be an integrated circuit in which the program is embedded, the circuit being adapted to execute or to be used in the execution of the above-mentioned method according to the development.

The programs according to the development can be downloaded in particular on an Internet-type network.

The invention claimed is:

1. A method of managing access to a plurality of bots by a user, wherein a bot search interface, run on a first terminal available to the user, performs the following:
during a first access by the user to the bot search interface:
receiving, via a user interface, an identifier associated with a target mobile terminal and an indication of a user's consent, the target mobile terminal belonging to the group comprising the first terminal if it is of the mobile type and at least a second mobile terminal different from the first terminal;

storing, on the first terminal, the identifier associated with the target mobile terminal and the indication of consent; and receiving, via the user interface, a request to launch a lookup operation with a view to selecting one of the bots and opening a conversation between the target mobile terminal and the selected bot;

during a subsequent access by the user to the bot search interface:

pre-displaying, via the user interface, the stored identifier associated with the target mobile terminal and indication of consent; and receiving, via the user interface, a new request to launch the lookup operation with a view to selecting again one of the bots and opening a conversation between the target mobile terminal and the newly selected bot.

2. The method according to claim 1, wherein in the pre-displaying the pre-displayed identifier can be modified, and in that, if the pre-displaying is followed by a receiving a modification, via the user interface, of the pre-displayed identifier by an identifier associated with another target mobile terminal, then the reception, via the user interface, of the new request to launch the lookup operation is with a view to selecting again one of the bots and opening a conversation between the other target mobile terminal and the newly selected bot.

3. The method according to claim 1, wherein in the pre-displaying, the pre-displayed identifier can be modified, and in that, if the pre-displaying is followed by a receiving a modification, via the user interface, of the pre-displayed identifier by another identifier associated with the target mobile terminal, then the reception, via the user interface, of the new request to launch the lookup operation is with a view to selecting one of the bots again and opening a conversation between the target mobile terminal, with the other identifier, and the newly selected bot.

4. The method according to claim 1, wherein the receiving, via the user interface, the identifier associated with the target mobile terminal and the indication of consent from the user, is followed by a launching a verification, with a server of a telecommunications operator, of the identifier received, and in that only a positive verification of the identifier received authorizes an execution of the receiving, via the user interface, the request to launch the lookup operation.

5. The method according to claim 1, wherein the bot search interface is run from a messaging client installed on the first terminal.

6. The method according to claim 1, wherein, prior to receiving the request to launch the lookup operation or receiving the new request to launch the lookup operation, the bot search interface performs a displaying, via the user interface, a link to terms and conditions applying to the plurality of bots, the link being able to be activated via the user interface.

7. A processing circuit comprising a processor and a memory of a first terminal available to a user, the memory storing program code instructions of a computer program that, when the computer program is executed by the processor, implements a method for managing access to a plurality of bots by the user, wherein a bot search interface, run on the first terminal, configures the processor to perform the following:

during a first access by the user to the bot search interface:

receiving, via a user interface, an identifier associated with a target mobile terminal and an indication of a user's consent, the target mobile terminal belonging to the group comprising the first terminal if it is of the mobile type and at least a second mobile terminal different from the first terminal;

storing, on the first terminal, the identifier associated with the target mobile terminal and the indication of consent; and receiving, via the user interface, a request to launch a lookup operation with a view to selecting one of the bots and opening a conversation between the target mobile terminal and the selected bot;

during a subsequent access by the user to the bot search interface:

pre-displaying, via the user interface, the stored identifier associated with the target mobile terminal and indication of consent; and receiving, via the user interface, a new request to launch the lookup operation with a view to selecting again one of the bots and opening a conversation between the target mobile terminal and the newly selected bot.

8. A computer-readable and non-transient storage medium, comprising program code instructions stored thereon for implementing a method for managing access to a plurality of bots by a user, wherein a bot search interface, run on a first terminal available to the user, performs the following when the instructions are executed by a processor:

during a first access by the user to the bot search interface:

receiving, via a user interface, an identifier associated with a target mobile terminal and an indication of a user's consent, the target mobile terminal belonging to the group comprising the first terminal if it is of the mobile type and at least a second mobile terminal different from the first terminal;

storing, on the first terminal, the identifier associated with the target mobile terminal and the indication of consent; and receiving, via the user interface, a request to launch a lookup operation with a view to selecting one of the bots and opening a conversation between the target mobile terminal and the selected bot;

during a subsequent access by the user to the bot search interface:

pre-displaying, via the user interface, the stored identifier associated with the target mobile terminal and indication of consent; and receiving, via the user interface, a new request to launch the lookup operation with a view to selecting again one of the bots and opening a conversation between the target mobile terminal and the newly selected bot.

9. A first terminal configured to manage access to a plurality of bots by a user, wherein the first terminal comprises a computing machine configured to run a bot search interface performing the following operations:

during a first access by the user to the bot search interface:

receiving, via a user interface, an identifier associated with a target mobile terminal and an indication of a user's consent, the target mobile terminal belonging to the group comprising the first terminal if it is of the mobile type and at least a second mobile terminal different from the first terminal;

storing, on the first terminal, the identifier associated with the target mobile terminal and the indication of consent; and receiving, via the user interface, a request to launch a lookup operation with a view to selecting one of the bots and opening a conversation between the target mobile terminal and the selected bot;

during a subsequent access by the user to the bot search interface:

pre-displaying, via the user interface, the stored identifier associated with the target mobile terminal and indication of consent; and receiving, via the user interface, a new request to launch the lookup operation with a view to selecting one of the bots again and opening a conversation between the target mobile terminal and the newly selected bot.

* * * * *